United States Patent
Parekh et al.

(10) Patent No.: US 10,121,383 B2
(45) Date of Patent: Nov. 6, 2018

(54) TERRAIN PROFILE SYSTEM

(71) Applicants: Devang R Parekh, San Diego, CA (US); Henry H Fung, San Diego, CA (US); Michel M Azar, San Diego, CA (US); Britton Bankson, Escondido, CA (US)

(72) Inventors: Devang R Parekh, San Diego, CA (US); Henry H Fung, San Diego, CA (US); Michel M Azar, San Diego, CA (US); Britton Bankson, Escondido, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/006,725

(22) Filed: Jan. 26, 2016

(65) Prior Publication Data

US 2017/0213465 A1 Jul. 27, 2017

(51) Int. Cl.
*G05D 1/00* (2006.01)
*G08G 5/00* (2006.01)
*G01C 21/20* (2006.01)

(52) U.S. Cl.
CPC ........... *G08G 5/0034* (2013.01); *G01C 21/20* (2013.01)

(58) Field of Classification Search
CPC .............................. G08G 5/0034; G01C 21/20
See application file for complete search history.

(56) References Cited

U.S. PATENT DOCUMENTS

| | | |
|---|---|---|
| 5,839,080 A | 11/1998 | Muller et al. |
| 6,229,536 B1 * | 5/2001 | Alexander ........... G01R 13/345 345/440 |
| 6,317,690 B1 | 11/2001 | Gia |
| 6,484,072 B1 | 11/2002 | Anderson et al. |
| 6,678,588 B2 | 1/2004 | He |
| 6,708,091 B2 | 3/2004 | Tsao |
| 7,280,897 B2 | 10/2007 | Allstadt et al. |
| 7,321,812 B2 | 1/2008 | Silberman et al. |

(Continued)

FOREIGN PATENT DOCUMENTS

| | | |
|---|---|---|
| CN | 103354041 A | 10/2013 |
| EP | 2286182 A2 | 2/2011 |
| WO | WO 2009/138989 A2 | 11/2009 |

*Primary Examiner* — Jess Whittington
(74) *Attorney, Agent, or Firm* — Tarolli, Sundheim, Covell & Tummino LLP

(57) ABSTRACT

One example includes a terrain profile system. A data store stores map data of a geographic region of interest and DTED. A route input system facilitates user inputs associated with defining a planned flight path of an aircraft between two points on a map associated with the map data and with defining flight characteristic data of the aircraft. A terrain profile controller defines a terrain signature associated with a topography of terrain features of the geographic region of interest along the planned flight path based on the DTED and a planned altitude of the aircraft along the planned flight path based on the flight characteristic data. A display system displays a terrain profile comprising the terrain signature, the planned altitude relative to the terrain signature, and a real-time location of the aircraft superimposed on the planned altitude based on real-time location data associated with the aircraft.

19 Claims, 7 Drawing Sheets

(56) References Cited

U.S. PATENT DOCUMENTS

| | | | | |
|---|---|---|---|---|
| 8,755,954 B1* | 6/2014 | McCusker | ............... | G01S 13/94 340/970 |
| 8,798,814 B1* | 8/2014 | Spencer | ................ | B64D 43/00 244/10 |
| 9,387,938 B1* | 7/2016 | Vanderkamp | .......... | B64D 45/00 |
| 2005/0270224 A1* | 12/2005 | Silberman | ............ | G05D 1/0646 342/65 |
| 2007/0265776 A1* | 11/2007 | Meunier | ................. | G08G 5/04 701/301 |
| 2008/0262664 A1* | 10/2008 | Schnell | ................. | G01C 23/00 701/4 |
| 2008/0306680 A1* | 12/2008 | Marty | .................... | G01C 21/00 701/533 |
| 2009/0024311 A1* | 1/2009 | Hess | .................... | G01C 23/005 701/448 |
| 2010/0066566 A1* | 3/2010 | Reusser | ................. | G01C 23/00 340/971 |
| 2010/0100313 A1* | 4/2010 | Aspen | .................... | G01C 21/00 701/532 |
| 2011/0196549 A1* | 8/2011 | Sharkany | ............... | G01C 23/00 701/8 |
| 2016/0210863 A1* | 7/2016 | Kohn-Rich | .......... | G05D 1/0646 |
| 2016/0284221 A1* | 9/2016 | Hinkle | ................. | G08G 5/0034 |
| 2016/0357488 A1* | 12/2016 | Albert | ....................... | G06F 3/14 |

* cited by examiner

TERRAIN PROFILE SYSTEM

TECHNICAL FIELD

The present disclosure relates generally to aviation, and specifically to a terrain profile system.

BACKGROUND

For many decades, aircraft have been implemented for a variety of uses as means of transportation, reconnaissance, and warfare. Pilots and controllers of aircraft often implement a number of different mechanisms for monitoring situational awareness of the aircraft, such as with respect to location and altitude. As an example, in military and reconnaissance missions, it may be necessary for an aircraft to fly at low altitudes. Thus, it may be important for the situational awareness to include information regarding the topography of geographic region in which the aircraft flies, such as to ensure that the aircraft does not collide with terrestrial terrain features. As some flight operations became increasingly more dangerous or tedious, unmanned aerial vehicles (UAV) have been developed as a means for replacing pilots in the aircraft for controlling the aircraft.

SUMMARY

One example includes a terrain profile system. A data store stores map data of a geographic region of interest and DTED. A route input system facilitates user inputs associated with defining a planned flight path of an aircraft between two points on a map associated with the map data and with defining flight characteristic data of the aircraft. A terrain profile controller defines a terrain signature associated with a topography of terrain features of the geographic region of interest along the planned flight path based on the DTED and a planned altitude of the aircraft along the planned flight path based on the flight characteristic data. A display system displays a terrain profile comprising the terrain signature, the planned altitude relative to the terrain signature, and a real-time location of the aircraft superimposed on the planned altitude based on real-time location data associated with the aircraft.

Another example includes a method for generating a terrain profile for an aircraft. The method includes storing map data and digital terrain and elevation data (DTED) associated with the geographic region of interest in a memory. The method also includes displaying a map associated with the map data on a display system associated with a human-machine interface (HMI) and facilitating user inputs associated with defining a non-linear planned flight path of an aircraft between two points on the map and with defining flight characteristic data associated with the aircraft. The method also includes generating a terrain signature associated with a topography of terrain features of the geographic region of interest along the planned flight path based on the DTED and generating a planned altitude of the aircraft along the planned flight path based on the flight characteristic data. The method further includes displaying the terrain profile comprising the terrain signature, the planned altitude relative to the terrain signature, and a real-time location of the aircraft superimposed on the planned altitude based on real-time location data associated with the aircraft on the display system associated with the HMI.

Another example includes a terrain profile system. The system includes a data store configured to store map data associated with a geographic region of interest, and to store DTED associated with the geographic region of interest. The system also includes a terrain profile controller configured to define a terrain signature associated with a topography of terrain features of the geographic region of interest along a non-linear planned flight path of an aircraft based on the DTED and to define a planned altitude of the aircraft along the planned flight path based on flight characteristic data. The system also includes an HMI that includes a route input system configured to facilitate user inputs associated with defining the planned flight path of the aircraft between two points on a map associated with the map data and with defining the flight characteristic data associated with the aircraft. The HMI also includes a display system configured to display the map, to display the real-time location of the aircraft superimposed on the planned flight path on the map based on real-time location data associated with the aircraft, and to display a terrain profile comprising the terrain signature, the planned altitude relative to the terrain signature, and a real-time location of the aircraft superimposed on the planned altitude based on the real-time location data associated with the aircraft.

DETAILED DESCRIPTION

Figure 1:
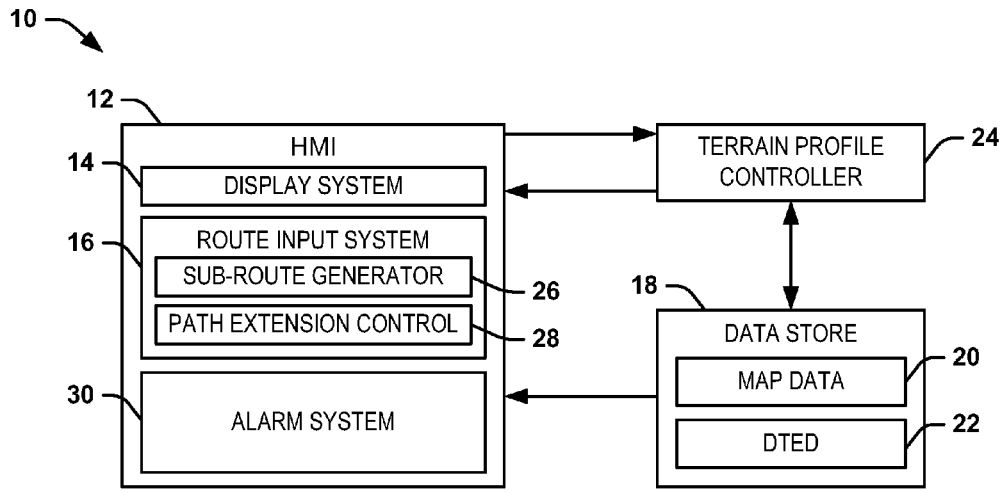
FIG. 1 illustrates an example of a terrain profile system.

The present disclosure relates generally to aviation, and specifically to a terrain profile system. The terrain profile system can be implemented in an aircraft (e.g., an unmanned aerial vehicle (UAV)) to provide visual information regarding a flight path for the aircraft. The terrain profile system can include a data store that stores map data associated with a geographic region of interest and digital terrain and elevation data (DTED) associated with the geographic region of interest. The map data can correspond to map software for displaying a map on a display system of a human-machine interface (HMI). The HMI also includes a route input system that facilitates user inputs to define a planned flight path of the aircraft between two points on the map, as well as user inputs that define flight characteristic data associated with the aircraft. As an example, the planned flight path can be a non-linear flight path.

The terrain profile system also includes a terrain profile controller that defines a terrain signature associated with a topography of terrain features of the geographic region along the planned flight path based on the DTED, and also defines a planned altitude of the aircraft along the planned flight path based on the flight characteristic data. The terrain profile can thus be displayed on the HMI display system, such that the terrain profile includes the terrain signature, the planned altitude relative to the terrain signature, and a real-time location of the aircraft superimposed on the planned altitude based on real-time location data associated with the aircraft. The real-time location of the vehicle can likewise be demonstrated on the map, such that the location of the aircraft can be tracked along the planned flight path relative to the terrain profile. As a result, the terrain profile can provide the pilot or operator of the aircraft with "at-a-glance" situational awareness of the planned flight path relative to the terrain. The demonstration of the planned flight path with the terrain signature, as well as the location of the vehicle on the planned route can provide a capability for a user to quickly identify potential dangers with respect to the terrain along the flight path, such that the user can respond to the potential dangers by changing the planned flight path.

In addition, the terrain profile system allows for the user to define a sub-terrain profile. As an example, the HMI can allow the user to select two waypoints on the route as the start and end of a route window (e.g., a sub-route that is a portion of the planned route). The terrain profile system can thus show the terrain profile of only the route window of the sub-route, in the event that the operator needs finer granularity of the terrain profile for a specific portion of the selected planned flight path. Additionally, the terrain profile system includes a path extension controller that can allow a user to define a variable lateral extension along the planned flight path as a path-width corridor along the planned flight path, such that the terrain profile system can provide an indication of the topography of the terrain features in the path-width corridor. For example, the terrain profile can provide the maximum elevation of the terrain features in the terrain signature within the path-width corridor in generating the terrain profile. Thus, the user can have radial awareness as to whether any terrain could impact any planned deviations from the original planned route.

FIG. 1 illustrates an example of a terrain profile system 10. The terrain profile system 10 can be implemented in a variety of aviation applications to provide situational awareness for an aircraft. For example, the terrain profile system 10 can be implemented in an unmanned aerial vehicle (UAV) control system to define routes for the UAV, such as for an autonomous UAV. The terrain profile system 10 includes a human-machine interface (HMI) 12 that facilitates user inputs and provides visual feedback to the user. Thus, the HMI 12 provides user control capability of the terrain profile system 10.

The HMI 12 includes a display system 14 (e.g., a monitor) that is configured to display a map of a geographic region of interest and other visual control components to the user, including a terrain profile. The HMI 12 also includes a route input system 16 that can facilitate user inputs to generate a planned flight path of the aircraft and flight characteristic data of the aircraft. The planned flight path can correspond to a non-linear flight path of the aircraft that can be demonstrated on the map of the geographic region of interest. As an example, the display system 14 can be a touchscreen, such that the display system 14 can be combined with the route input system 16 to allow the user to draw the planned flight path on the map as it is displayed via the display system 14. The flight characteristic data can correspond to a variety of parameters of the flight of the aircraft along the planned flight path, such as including a planned altitude and a planned velocity.

The terrain profile system 10 also includes a data store 18 that is configured to store map data 20 and digital terrain and elevation data (DTED) 22. The map data 20 can correspond to a map or navigation software that is associated with the geographic region of interest and which is provided to the HMI 12 to facilitate display of the map on the display system 14. The DTED 22 can correspond to the topography of the geographic region of interest, and thus corresponds to three-dimensional elevation of the terrain features of the geographic region of interest.

The terrain profile system 10 further includes a terrain profile controller 24 configured to generate a terrain profile associated with the planned flight path. As an example, in response to the user providing the inputs associated with the planned flight path, the HMI 12 can provide the planned flight path to the terrain profile controller 24. The terrain profile controller 24 can thus access the data store 18 to cross-reference the planned flight path with the DTED 22 to ascertain a terrain signature associated with the topography of the terrain features along the planned flight path. As described herein, the term "terrain signature" corresponds to an elevation profile of the terrain features along the planned flight path, as provided from an axis that extends straight downward from the aircraft along the planned flight path. Thus, the terrain profile controller 24 can determine the elevation of every point along the planned flight path based on the DTED 22 to express the terrain signature as a two-dimensional profile of the elevation of the terrain features directly over which the aircraft is intended to fly.

In addition, the terrain profile controller 24 can be provided the flight characteristic data from the HMI 12 to generate a planned altitude along the planned flight path, such that the planned altitude can be correlated with the terrain signature. Therefore, the terrain profile controller 24 can generate the terrain profile to include the planned altitude of the aircraft superimposed with the terrain signature to provide the pilot or operator of the aircraft with "at-a-glance" situational awareness of the planned flight path relative to the terrain. Additionally, the terrain profile controller 24 can be configured to access real-time location data from the aircraft, such as from a global navigation satellite system (GNSS) sensor (e.g., global position satellite (GPS) sensor) located on the aircraft. Thus, the terrain profile controller 24 can superimpose the location of the aircraft on the planned altitude of the terrain profile to demonstrate a location of the aircraft relative to the terrain signature, and thus relative to the terrain features. Additionally, the terrain profile controller 24 can superimpose the location of the aircraft on the map that is displayed via the display system 14. Accordingly, the terrain profile controller 24 can coordinate the location of the aircraft in both the map and the terrain profile, such that the pilot or operator of the aircraft can correlate the location and features of the map with the corresponding terrain features.

Figure 2:
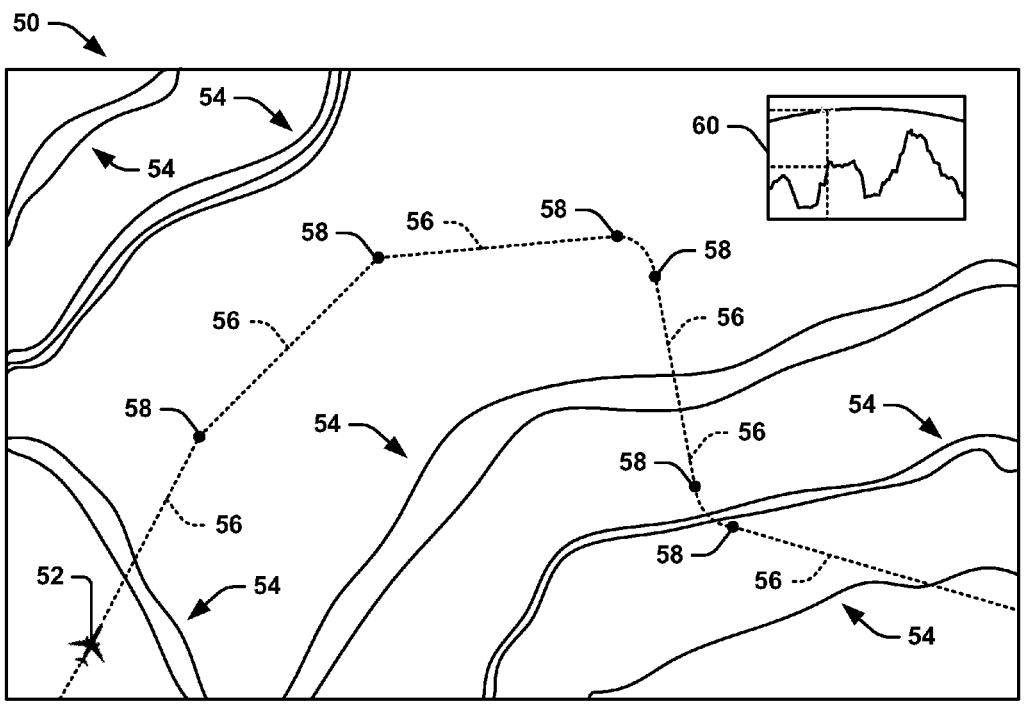
FIG. 2 illustrates an example diagram of a mission map.

FIG. 2 illustrates an example diagram 50 of a mission map. The mission map in the diagram 50 can be displayed via the display system 14 in the example of FIG. 1. Thus, reference is to be made to the example of FIG. 1 in the following description of the example of FIG. 2. The diagram 50 demonstrates a mission map as a graphical virtual environment of the geographic region of interest. As an example, the mission map of the diagram 50 can be displayed during mission planning on the display system 14 of the HMI 12. Additionally or alternatively, the mission map can be displayed in real-time, such that a user can visually monitor the status of the aircraft, demonstrated at 52 in the example of FIG. 2, in real-time. Using a route input system, such as the route input system 16, the user can provide user inputs including the planned flight path and flight characteristic data associated with the aircraft 52.

In the example of FIG. 2, the map is demonstrated as including topographical features 54, and can also include a variety of other features (e.g., buildings, bodies of water, etc.). The map also graphically demonstrates a planned flight path 56 of the aircraft 52. The planned flight path 56 can have been provided on the map via user inputs, and includes a series of way points 58 at which the planned flight-path 56 changes. Thus, the planned flight path 56 is non-linear between the location of the aircraft 52 and an end location. In response to the generation of the planned flight path 56 on the map, as well as the flight characteristic data, the terrain profile system 24 can generate a terrain profile 60 that is graphically demonstrated via the display system 14. In the example of FIG. 2, the terrain profile 60 is demonstrated as superimposed over a portion of the map. As an example, the user can expand the terrain profile 60, switch the display of the terrain profile 60 and the map, and/or zoom the size of the terrain profile 60. Alternatively, the terrain profile 60 can be displayed at the same size as and in addition to the map on the display system 14.

Figure 3:
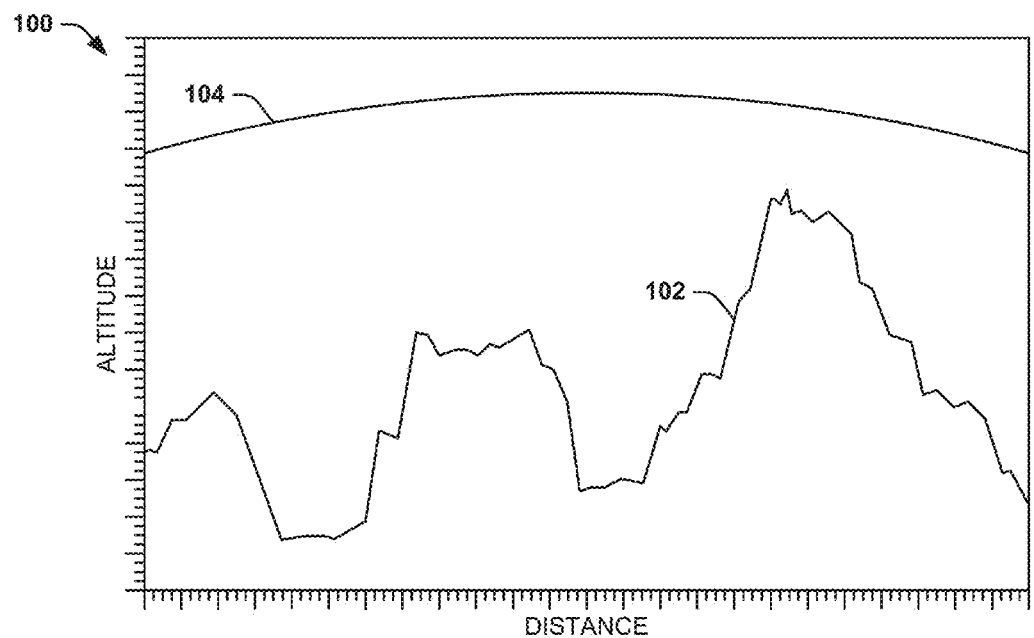
FIG. 3 illustrates an example of a terrain profile.
Figure 4:
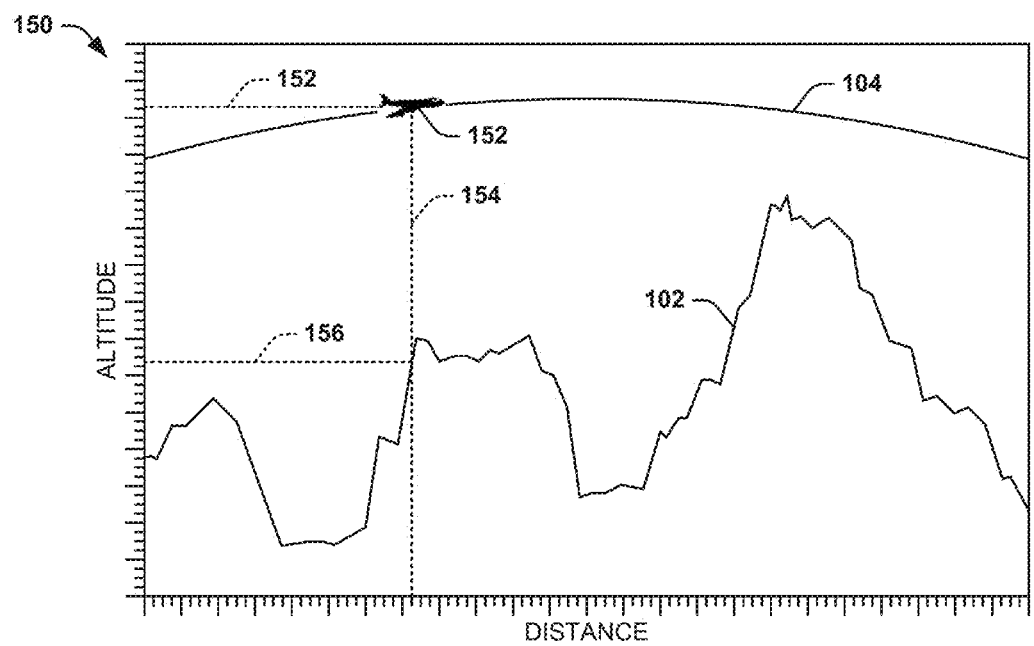
FIG. 4 illustrates another example of a terrain profile.

FIGS. 3 and 4 illustrate examples of terrain profiles. FIG. 3 demonstrates a terrain profile 100, and FIG. 4 demonstrates a terrain profile 150. The terrain profiles 100 and 150 can be generated by the terrain profile controller 24 in the example of FIG. 1. As an example, the terrain profiles 100 and 150 can be generated based on the planned flight path 56 of the aircraft 52 in the example of FIG. 2. Therefore, reference is to be made to the example of FIGS. 1 and 2 in the following description of the example of FIG. 3. The terrain profiles 100 and 150 are demonstrated similar to a graph that plots the terrain signature 102 along a distance of the planned flight path as a function of altitude. The terrain profiles 100 and 150 also include a planned altitude 104 of the aircraft along the planned flight path, and thus extending along the distance of the terrain profiles 100 and 150 at the associated altitude in scale and relative to the terrain signature 102. As an example, the terrain profile 100 can correspond to a planned terrain profile, such as generated during a mission plan. The terrain profile 150 includes the aircraft, demonstrated at 152, superimposed on the planned altitude 104. Thus, the terrain profile 150 can correspond to a real-time terrain profile that demonstrates the location of the aircraft 152 relative to the terrain signature 102 in real-time, and thus the relative location of the aircraft 152 and the actual terrain features along the planned flight path.

Therefore, the terrain profiles 100 and 150 can provide the pilot or operator of the aircraft with "at-a-glance" situational awareness of the planned flight path relative to the terrain features. As an example, the terrain profiles 100 and 150 can include a variety of other situational awareness data, as well, such as numerical displays of the altitude of the aircraft 152 and/or a difference of the altitude of the aircraft 152 relative to the terrain signature 102. In the example of FIG. 4, the terrain profile 150 also includes a dotted line visual indicator 154 that provides a quick visual indication of the altitude of the aircraft 152. The terrain profile 150 also includes a dotted line visual indicator 156 that provides an indication of the specific portion of the terrain signature 102 over which the aircraft 152 is located in real-time, as well as a dotted line visual indicator 158 that provides an indication of the elevation of the of the specific portion of the terrain signature 102 over which the aircraft 152 is located in real-time.

Thus, the dotted line visual indicators 154, 156, and 158 can provide further "at-a-glance" situational awareness of the aircraft 152 in real-time.

Referring back to the example of FIG. 1, the route input system 16 includes a sub-route generator 26 and a path extension controller 28. The sub-route generator 26 is configured to allow the user to define a sub-terrain profile between two points along the planned flight path. As an example, the user can provide inputs via the route input system 16 to select two waypoints on the planned flight path as the start and end of a sub-flight path (e.g., a sub-route that is a portion of the planned route). The terrain profile controller 24 can thus generate the sub-terrain profile which can be demonstrated via the display system 14, thus providing finer granularity of the terrain profile for a specific portion of the planned flight path.

Figure 5:
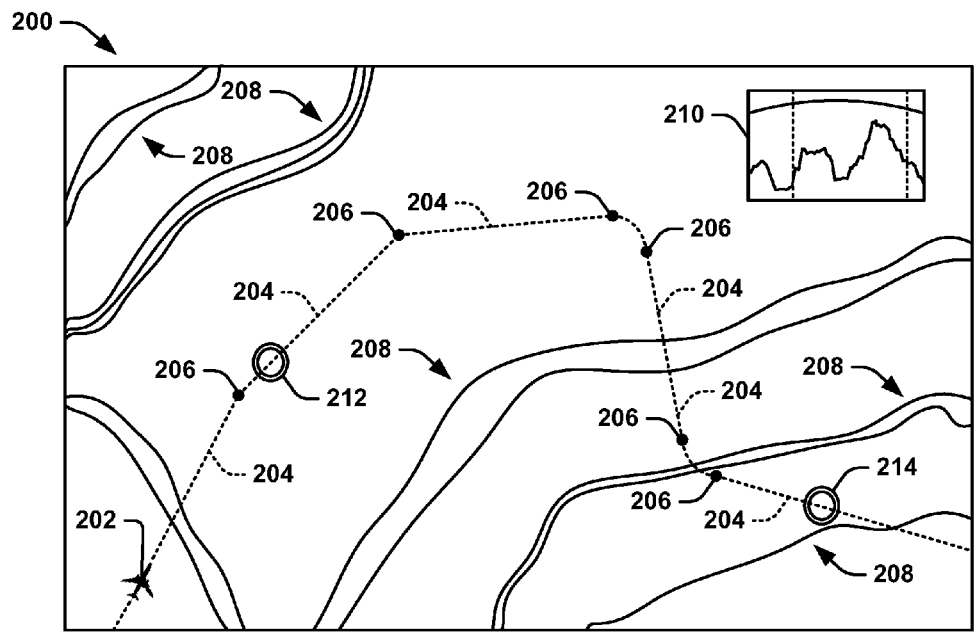
FIG. 5 illustrates another example diagram of a mission map.

FIG. 5 illustrates another example diagram 200 of the mission map. The mission map in the diagram 200 can be displayed via the display system 14 in the example of FIG. 1. In the example of FIG. 5, the mission map includes the same features as demonstrated in the diagram 50 in the example of FIG. 2. Thus, reference is to be made to the example of FIGS. 1-4 in the following description of the example of FIG. 5.

The mission map graphically demonstrates an aircraft 202, as well as a planned flight path 204 of the aircraft 202. The planned flight path 204 can have been provided on the map via user inputs, and includes a series of way points 206 at which the planned flight-path 204 changes. Thus, the planned flight path 204 is non-linear between the location of the aircraft 202 and an end location. In the example of FIG. 5, the map is also demonstrated as including topographical features 208, and can also include a variety of other features (e.g., buildings, bodies of water, etc.). In response to the generation of the planned flight path 204 on the map, as well as the flight characteristic data, the terrain profile system 24 can generate a terrain profile 210 that is graphically demonstrated via the display system 14.

In the example of FIG. 5, the user can define a sub-terrain profile between two points along the planned flight path 204 via the sub-route generator 26. The two points along the planned flight path 204 are demonstrated as a start point 212 and an end point 214, respectively. Thus, the start point 212 and the end point 214 can correspond to the start and end, respectively, of a sub-flight path (e.g., a sub-route that is a portion of the planned route). The terrain profile controller 24 can thus generate the sub-terrain profile which can be demonstrated via the display system 14, thus providing finer granularity of the terrain profile 210 for a specific portion of the planned flight path 204.

Figure 6:
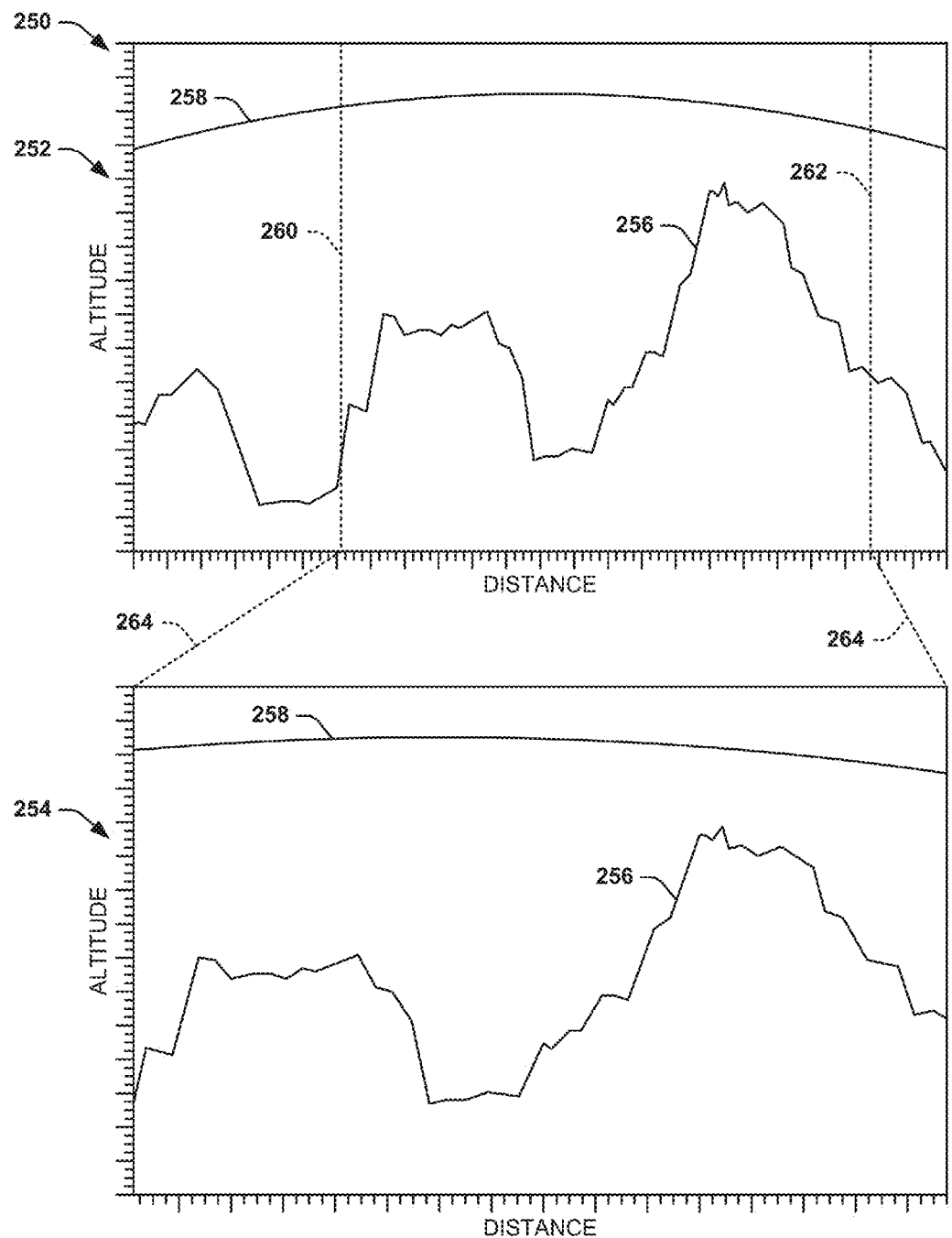
FIG. 6 illustrates an example diagram of terrain profiles.

FIG. 6 illustrates an example diagram 250 of terrain profiles. The diagram 250 includes a terrain profile 252 that can correspond to the terrain profile 210 in the example of FIG. 5, and which is arranged substantially similar to the terrain profile 100 in the example of FIG. 3. The diagram 250 also includes a sub-terrain profile 254 that can be generated via the terrain profile controller 24. Each of the terrain profile 252 and the sub-terrain profile 254 include a terrain signature 256 and a planned altitude 258. In the example of FIG. 6, the terrain profile 252 includes a bounding window that is defined by a start line 260 and an end line 262. As an example, the start line 260 can be generated by the terrain profile controller 24 and provided on the terrain profile 252 in response to selection of the start point 212 on the mission map in the example of FIG. 5. Similarly, the end line 262 can be generated by the terrain profile controller 24 and provided on the terrain profile 252 in response to selection of the end point 214 on the mission map in the example of FIG. 5. Alternatively, the user can select the start line 260 and the end line 262 on the terrain profile 252 directly, such that the start point 212 and the end point 214 are generated on the mission map in response to selection of the start line 260 and the end line 262 on the terrain profile 252.

In the example of FIG. 6, in response to the generation of the start line 260 and the end line 262, the terrain profile controller 24 can generate the sub-terrain profile 254 that corresponds to the sub-route that is bounded by the start line 260 and the end line 262 of the terrain profile 252. The sub-terrain profile 254 is demonstrated as having a size that is approximately equal to the terrain profile 252, such that the terrain profile system 24 can graphically present the sub-terrain profile 254 in a manner that is substantially the same as a terrain profile (e.g., the terrain profile 252) based on scaling (e.g., stretching) the distance between the start line 260 and the end line 262, as well as the terrain signature 256 and the planned altitude 258, as demonstrated by the zoom lines 264. Thus, the sub-terrain profile 254 can be demonstrated to provide finer granularity of the terrain profile 252 for a defined portion of the planned flight path. While the terrain profile 252 and the sub-terrain profile 254 do not demonstrate the aircraft 202, it is to be understood that the aircraft 202 can be demonstrated as superimposed on the planned altitude 258, such as similar to the aircraft 152 in the terrain profile 150 in the example of FIG. 4.

Referring back to the example of FIG. 1, the path extension controller 28 can be configured to allow a user to define a variable lateral extension along the planned flight path as a path-width corridor along the planned flight path. Thus, the terrain profile controller 24 can be configured to provide an indication of the topography of all of the terrain features in the path-width corridor in the resultant terrain profile, as opposed to merely a two-dimensional representation of the terrain features directly over which the aircraft flies. For example, the terrain profile controller 24 can generate the terrain profile to demonstrate the indication of the terrain signature of other terrain features in the path-width corridor in a manner distinct from the terrain features directly over which the aircraft flies. As another example, the terrain profile controller 24 can generate the terrain profile to demonstrate the maximum elevation of all of the terrain features in the terrain signature within the path-width corridor in generating the terrain profile. Thus, the user can have radial awareness as to whether any terrain could impact any planned deviations from the original planned route, as provided by the terrain profile displayed on the display system 14.

Figure 7:
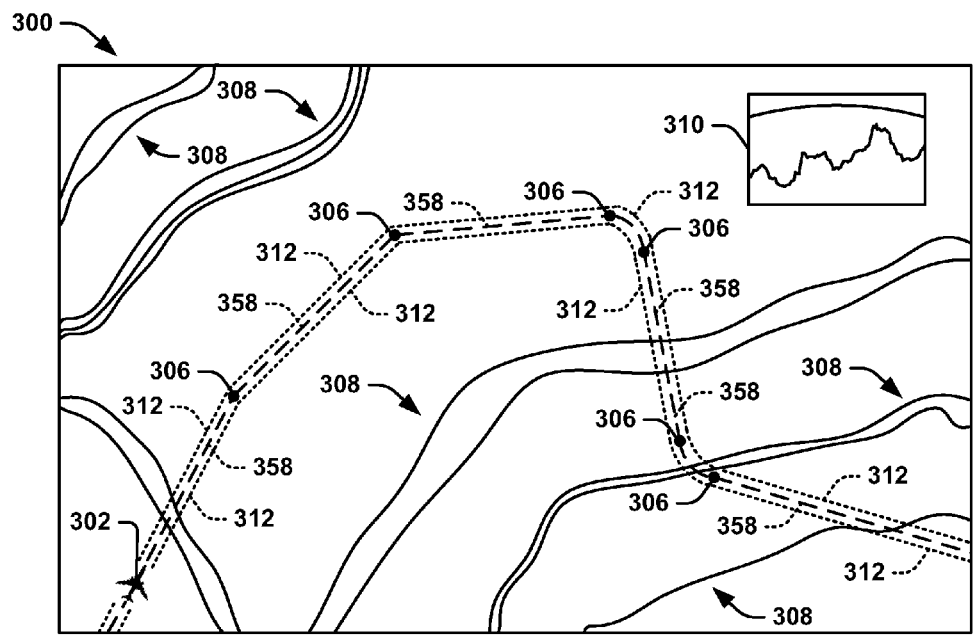
FIG. 7 illustrates yet another example diagram of a mission map.

FIG. 7 illustrates another example diagram 300 of the mission map. The mission map in the diagram 300 can be displayed via the display system 14 in the example of FIG. 1. In the example of FIG. 7, the mission map includes the same features as demonstrated in the diagram 50 in the example of FIG. 2. Thus, reference is to be made to the example of FIGS. 1-4 in the following description of the example of FIG. 7.

The mission map graphically demonstrates an aircraft 302, as well as a planned flight path 304 of the aircraft 302. The planned flight path 304 can have been provided on the map via user inputs, and includes a series of way points 306 at which the planned flight-path 304 changes. Thus, the planned flight path 304 is non-linear between the location of the aircraft 302 and an end location. In the example of FIG. 7, the map is also demonstrated as including topographical features 308, and can also include a variety of other features (e.g., buildings, bodies of water, etc.). In response to the generation of the planned flight path 304 on the map, as well as the flight characteristic data, the terrain profile system 24 can generate a terrain profile 310 that is graphically demonstrated via the display system 14.

In the example of FIG. 7, the user can define a path-width corridor corresponding to a programmable lateral extension from the planned flight path 304 along the length of the planned flight path 304. In the example of FIG. 7, the path-width corridor is demonstrated by lines 312 that are situated next to and along the planned flight path 304. The path-width corridor that is bounded by the lines 312 along the planned flight path 304 can thus be implemented by the terrain profile controller 24 to generate the terrain profile 310, such that the terrain profile 310 can indicate an aggregation of the terrain signature of all of the terrain features within the path-width corridor along the planned flight path 304. Therefore, the terrain profile 310 can provide an indication of the topography of the terrain features in the path-width corridor bounded by the lines 312. Accordingly, the "at-a-glance" situational awareness can include radial awareness as to whether any terrain could impact any planned deviations from the original planned route associated with the planned flight path 304, such as based on avoiding threats or ordnance.

Figure 8:
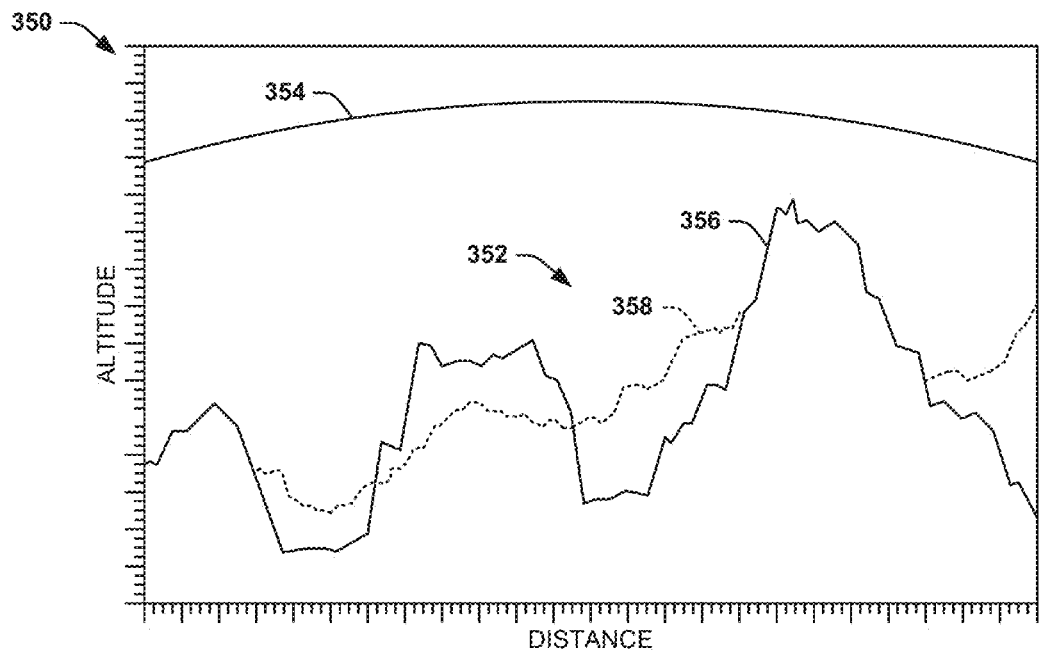
FIG. 8 illustrates yet a further example of a terrain profile.

FIG. 8 illustrates yet a further example of a terrain profile 350. The terrain profile 350 can correspond to the terrain profile 310 in the example of FIG. 7. The terrain profile 350 can be arranged substantially similar to the terrain profile 100 in the example of FIG. 3, such that the terrain profile 350 includes a terrain signature 352 and a planned altitude 354. As an example, the terrain profile 350 can be generated by the terrain profile controller 24 in response to and/or based on defining a path-width corridor (e.g., bounded by the lines 312).

In the example of FIG. 8, the terrain signature 352 includes a solid-line portion 356 corresponding to the terrain signature of the planned flight path 302, and thus corresponding to an intersection of the terrain features and an axis that extends straight down from the aircraft 302, and thus corresponding to the terrain features over which the aircraft 302 directly flies over. The terrain signature 352 also includes dashed-line portions 358 that can correspond to a terrain signature of terrain features that are within the path-width corridor but laterally distant from the axis, and thus laterally distant from the portion of the planned flight path 304 corresponding to the terrain features over which the aircraft 302 directly flies over. Thus, the terrain profile 350 provides visual indication of the other terrain features that reside within the path-width corridor.

As an example, the dashed-line portions 358 can be visually demonstrated in a different manner from not only the solid-line portion 356, but also of other portions of itself. For example, the dashed-line portions 358 can be demonstrated differently for terrain on the port-side of the aircraft 302 relative to the starboard side of the aircraft 304, and can be demonstrated differently based on the distance along the lateral extension from the planned flight path 304. Accordingly, the indication of the terrain signature of the terrain features in the path-width corridor can be expressed in a variety of different ways.

Figure 9:
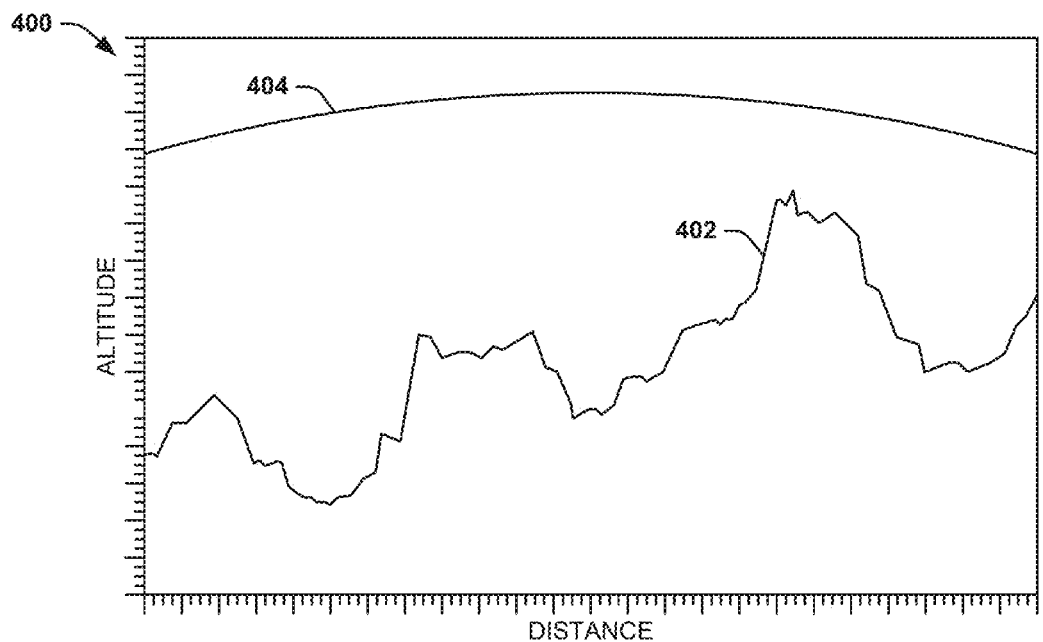
FIG. 9 illustrates yet a further example of a terrain profile.

FIG. 9 illustrates yet a further example of a terrain profile 400. The terrain profile 400 can correspond to the terrain profile 310 in the example of FIG. 7. The terrain profile 400 can be arranged substantially similar to the terrain profile 100 in the example of FIG. 3, such that the terrain profile 400 includes a terrain signature 402 and a planned altitude 404.

As an example, the terrain profile 400 can be generated by the terrain profile controller 24 in response to and/or based on defining a path-width corridor (e.g., bounded by the lines 312), such as in addition to or in alternative to the terrain profile 350 in the example of FIG. 8.

In the example of FIG. 8, the terrain signature 402 is generated by the terrain profile controller 24 as a single solid-line that corresponds to an aggregation of all of the terrain features within the path-width corridor bounded by the dashed lines 312 along the planned flight path 304. Thus, to maintain a conservative estimation of the elevation of the terrain features, the terrain signature 402 is demonstrated as maximum elevation of all of the terrain features along the lateral extension from the planned flight path 304 along the planned flight path 304. Thus, terrain signature 402 corresponds to the maximum elevation of the solid-line portion 356 and the dashed-line portions 358 of the terrain signature 352 in the example of FIG. 8, wherein the terrain signatures 352 and 402 both correspond to the planned flight path 304 and the path-width corridor bounded by the dashed lines 312. Accordingly, both of the terrain signatures 352 and 402 can provide "at-a-glance" situational awareness that includes radial awareness as to whether any terrain could impact any planned deviations from the original planned route associated with the planned flight path 304. In addition, the maximum elevation for the terrain features in the path-width corridor can be cached in a memory (e.g., the data store 16) to mitigate degradation of the display (e.g., the display system 14) from a performance aspect, such that maximum elevation terrain signature, such as defined by the dashed-line portions are only re-calculated when a new planned flight path 304 is selected or the parameters of the calculation are changed, such as the lateral extension distance.

Referring back to the example of FIG. 1, as described previously, the terrain profile system 10 can operate in real-time, such as by demonstrating the aircraft as superimposed over the planned altitude in the terrain profile. Additionally, the terrain profile system 10 can be configured to allow changes to the planned flight path, such as during real-time operation of the aircraft. For example, during a mission, the user can facilitate the user inputs via the route input system 16 to change the planned flight path and/or the flight characteristic data, and thus redirecting the flight of the aircraft. Thus, the change to the planned flight path can be reflected on the map that is indicated on the display system 14. As a result, the terrain profile controller 24 can access the data store 18 to cross-reference the new planned flight path with the DTED 22 to ascertain a terrain signature associated with the topography of the terrain features along the new planned flight path. Additionally, the terrain profile controller 24 can update the planned altitude along the planned flight path, such that the planned altitude can be correlated with the terrain signature. Therefore, the terrain profile controller 24 can update the terrain profile to include the new planned altitude of the aircraft and/or the new terrain signature to provide the pilot or operator of the aircraft with "at-a-glance" situational awareness of the planned flight path relative to the terrain in real-time.

In the example of FIG. 1, the HMI 12 includes an alarm system 30 that is configured to identify a potential collision of the aircraft with the terrain features along the planned flight path in response to the generation of the terrain profile via the terrain profile controller 24. As an example, the alarm system 30 can identify on the terrain profile an intersection of the planned altitude with the terrain signature, and can provide an indication of the potential collision on the terrain profile on the display system 14 to the user. For example, the alarm system 30 can provide a visual indication via the display system 14, and can also provide audial and/or haptic indications, as well. Thus, the alarm system 30 can provide a rapid indication of potential danger in real-time in response to on-the-fly changes to the planned flight path and/or the planned altitude.

Figure 10:
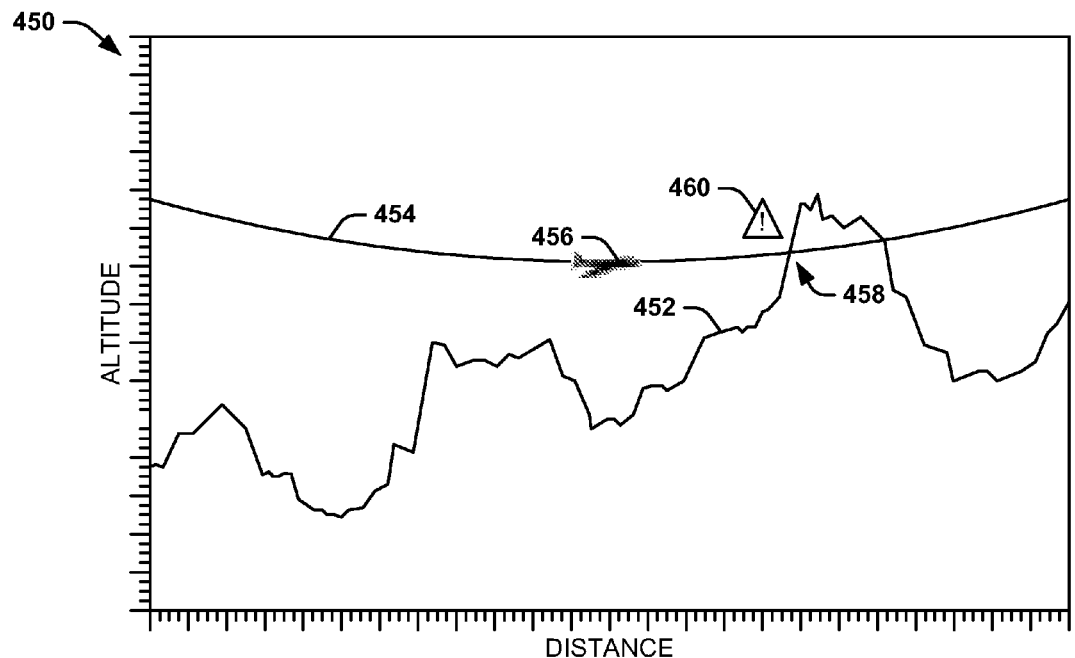
FIG. 10 illustrates yet a further example of a terrain profile.
Figure 11:
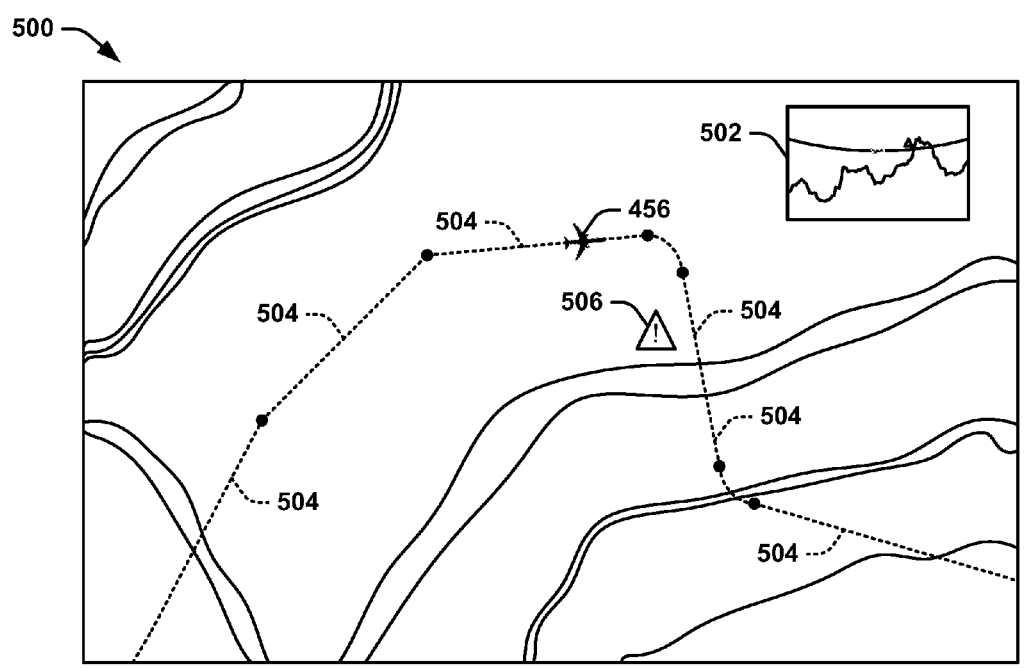
FIG. 11 illustrates yet a further example diagram of a mission map.

FIG. 10 illustrates yet a further example of a terrain profile 450. FIG. 11 illustrates yet a further example diagram 500 of a mission map. The terrain profile 450 can be arranged substantially similar to the terrain profile 150 in the example of FIG. 4, such that the terrain profile 450 includes a terrain signature 452 and a planned altitude 454 on which the aircraft 456 is superimposed. As an example, the terrain profile 450 can be generated by the terrain profile controller 24, such as in real-time based on a change to the planned flight path 452 and/or the planned altitude 454. The mission map in the diagram 500 can be displayed via the display system 14 in the example of FIG. 1. In the example of FIG. 11, the mission map includes the same features as demonstrated in the diagram 50 in the example of FIG. 2. In the example of FIG. 11, the diagram 500 includes a terrain profile 502 that can correspond to the terrain profile 450 in the example of FIG. 10, such that the terrain profiles 450 and 502 are generated based on a planned flight path 504. Thus, like reference numbers are used in the examples of FIGS. 10 and 11.

In the example of FIG. 10, the terrain profile 450 demonstrates an intersection of the terrain signature 452 and the planned altitude 454, demonstrated at 458. Thus, since the aircraft 456 is intended to traverse the path defined by the planned altitude 454, the intersection 458 represents a point on the planned flight path at which the aircraft 456 will collide with the terrain features associated with the terrain signature 452. Accordingly, the alarm system 30 can provide a visual indication of the potential collision, demonstrated at 460. For example, the visual indication 460 of the potential collision can be accompanied by other alarm indications, such as other visual components, audial components, or haptic components. The alarm system 30 can likewise provide the visual indication on the map, demonstrated in the example of FIG. 11 at 506. As a result, the user can provide further on-the-fly changes to the planned flight path and/or the planned altitude to determine a safe planned flight path or altitude for the aircraft 456 in response to the visual indication 460 and/or other alarms provided by the alarm system.

Figure 12:
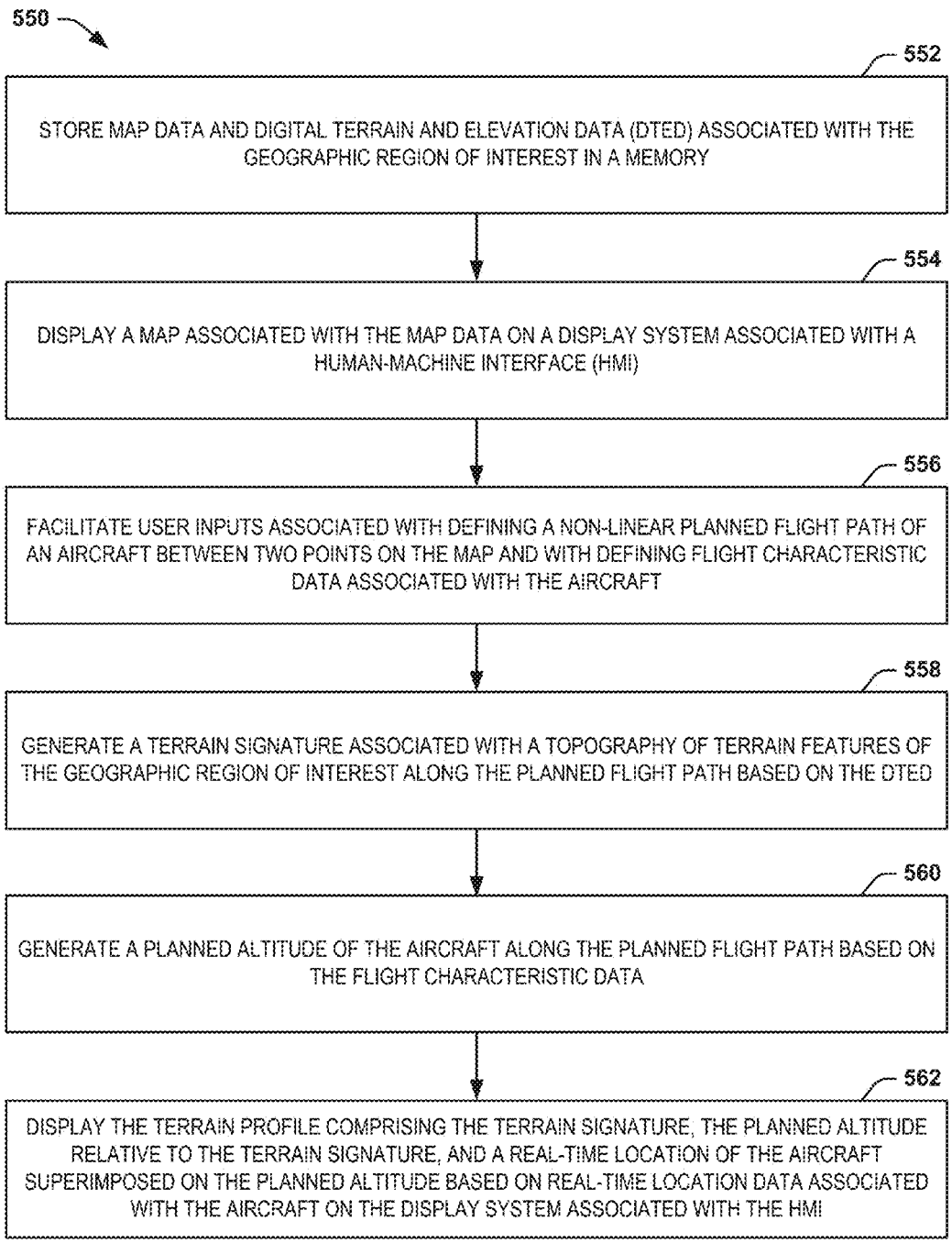
FIG. 12 illustrates an example of a method for generating a terrain profile.

In view of the foregoing structural and functional features described above, a methodology in accordance with various aspects of the present invention will be better appreciated with reference to FIG. 12. While, for purposes of simplicity of explanation, the methodology of FIG. 12 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 12 illustrates an example of a method 550 for generating a terrain profile (e.g., the terrain profile 100). At 552, map data (e.g., the map data 20) and DTED (e.g., the DTED 22) associated with the geographic region of interest is stored in a memory (e.g., the data store 18). At 554, a map associated with the map data is displayed on a display system (e.g., the display system 14) associated with an HMI (e.g., the HMI 12). At 556, user inputs associated with defining a non-linear planned flight path (e.g., the planned flight path 56) of an aircraft (e.g., the aircraft 52) between two points on the map (e.g., the start point 212 and the end point 214) and with defining flight characteristic data associated with the aircraft are facilitated. At 558, a terrain signature (e.g., the terrain signature 102) associated with a topography of terrain features of the geographic region of interest along the planned flight path is generated based on the DTED. At 560, a planned altitude (e.g., the planned altitude 104) of the aircraft along the planned flight path is generated based on the flight characteristic data. At 562, the terrain profile comprising the terrain signature, the planned altitude relative to the terrain signature, and a real-time location of the aircraft superimposed on the planned altitude based on real-time location data associated with the aircraft is displayed on the display system associated with the HMI.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A terrain profile system comprising: a data store that includes a non-transitory machine readable memory that stores map data corresponding to map software for displaying a map, digital terrain, and elevation data (DTED) associated with the geographic region of interest; a human-machine interface (HMI) that includes a route input system to receive user inputs to define a planned flight path of an aircraft between two points on a map associated with the map data and with defining flight characteristic data associated with the aircraft; a terrain profile controller that determines a terrain elevation and generates a terrain profile comprising a terrain signature that includes a topography of maximum elevation terrain features of the geographic region of interest with respect to an altitude of the aircraft within a path-width corridor along the planned flight path based on the user inputs defining the planned flight path, the DTED, and a planned altitude of the aircraft along the planned flight path based on the flight characteristic data; a sub-route generator that receives a user selected start line and end line on the terrain profile to generate a sub-terrain profile comprising a finer granular profile of the terrain profile for a portion of the planned flight path that is defined in a bounding window bounded by the start line and the end line on the terrain profile, wherein a start point and an end point defining a sub-route of the planned flight path, corresponding to the start line and end line, are generated on the map in response to the start line and end line selected on the terrain profile; and a display system that displays the terrain profile comprising the terrain signature, the planned altitude relative to the terrain signature, a real-time location of the aircraft superimposed on the planned altitude based on real-time location data associated with the aircraft, and the sub-terrain profile; wherein the HMI controls the aircraft in real-time according to the user inputs.

2. The system of claim 1, wherein the planned flight path between the two points is a non-linear path between a start point and an end point associated with the planned flight path of the aircraft on the map defined by the map data.

3. The system of claim 1, wherein the route input system comprises a path extension controller that receives an input associated with the path-width corridor corresponding to a lateral path extension distance from the aircraft along the planned flight path, wherein the terrain profile controller provides an indication of the terrain features within the path-width corridor in the terrain profile based on the DTED associated with the geographic region of interest.

4. The system of claim 1, wherein the display system displays the real-time location of the aircraft superimposed on the planned flight path on the map defined by the map data based on the real-time location data associated with the aircraft.

5. The system of claim 1, wherein the terrain profile controller changes the terrain profile in response to changes to the planned flight path and the planned altitude in response to changes to the flight characteristic data in real-time during flight of the aircraft via user inputs provided to the route input system.

6. The system of claim 5, further comprising an alarm system that provides an indication on the terrain profile of an intersection of the planned altitude with the terrain signature in response to the change in the terrain signature, and indicates the location of the collision on the map.

7. A control system for an unmanned aerial vehicle (UAV) comprising the terrain profile system of claim 1.

8. The system of claim 1, wherein the display system displays the sub-terrain profile in a size proximate to a size of the terrain profile by scaling the distance between the start line and the end line, the terrain signature, and the planned altitude.

9. A method for generating a terrain profile for an aircraft, the method comprising: storing map data and digital terrain and elevation data (DTED) associated with a geographic region of interest in a memory; displaying a map associated with the map data on a display system associated with a human-machine interface (HMI); facilitating user inputs associated with defining a non-linear planned flight path of an aircraft between two points on the map, and with defining flight characteristic data associated with the aircraft; generating a terrain profile that includes an aggregate topography of terrain features of the geographic region of interest within a path-width corridor along the non-linear planned flight path based on the user inputs defining the planned flight path and the DTED; generating a planned altitude of the aircraft along the non-linear planned flight path based on the flight characteristic data; facilitating user inputs associated with defining a start line and an end line on the terrain profile generating a sub-terrain profile comprising a finer granular profile of the terrain profile for a portion of the planned flight path defined in a bounding window bounded by the start line and an the end line on the terrain profile; generating on the map a start point and an end point defining a sub-route of the planned flight path, corresponding to the start line and end line, in response to the start line and end line defined on the terrain profile; and displaying the terrain profile comprising the terrain signature, the planned altitude relative to the terrain signature, a real-time location of the aircraft superimposed on the planned altitude based on real-time location data associated with the aircraft on the display system associated with the HMI, and the sub-terrain profile; wherein the HMI controls the aircraft in real-time according to the user inputs.

10. The method of claim 9, further comprising:
facilitating user inputs associated with defining a sub-portion of the terrain profile based on selecting sub-points on the non-linear planned flight path on the map; and
generating a sub-terrain profile based on the terrain signature and the planned altitude relative to the terrain signature along the sub-portion of the terrain profile.

11. The method of claim 9, further comprising:
facilitating user inputs associated with defining the path-width corridor corresponding to a lateral path extension distance from the aircraft along the non-linear planned flight path; and
providing an indication of the aggregate topography of terrain features within the path-width corridor in the terrain profile based on the DTED associated with the geographic region of interest.

12. The method of claim 11, wherein providing the indication of the terrain features comprises generating the terrain signature to display a maximum elevation associated with the topography of the terrain features within the path extension controller along the non-linear planned flight path.

13. The method of claim 9, further comprising displaying the real-time location of the aircraft superimposed on the non-linear planned flight path on the map defined by the map data based on the real-time location data associated with the aircraft.

14. The method of claim 9, further comprising:
facilitating user inputs associated with changes to at least one of the non-linear planned flight path and the planned altitude;
changing the terrain profile in response to the changes to the at least one of the non-linear planned flight path and the planned altitude in real-time during flight of the aircraft; and
providing an indication of a collision on the terrain profile and on the map of the planned altitude with the terrain signature in response to the change in the terrain profile.

15. The method of claim 9, further comprising displaying the sub-terrain profile in a size proximate to a size of the terrain profile by scaling the distance between the start line and the end line, the terrain signature, and the planned altitude.

16. A terrain profile system comprising: a data store that includes a memory to store map data associated with a geographic region of interest, and to store digital terrain and elevation data (DTED) associated with the geographic region of interest; a terrain profile controller that generates a terrain profile comprising a terrain signature associated with a topography of terrain features of the geographic region of interest along a nonlinear planned flight path of an aircraft based on user inputs defining the non-linear planned flight path and the DTED and that defines a planned altitude of the aircraft along the non-linear planned flight path based on flight characteristic data; and a human-machine interface (HMI) comprising: a route input system that receives the user inputs defining the non-linear planned flight path of the aircraft between two points on a map associated with the map data and with defining the flight characteristic data associated with the aircraft, and that receives a user-selected start and end line on the terrain profile; a sub-route generator that receives the user-selected start and end line to generate a sub-terrain profile comprising a finer granular profile of the terrain profile for a portion of the planned flight path that is bounded by a bounding window having the start line and the end line on the terrain profile; and a display system that displays the map, a start point and an end point defining a sub-route of the planned flight path on the map that corresponds to the start line and end line on the terrain profile, the real-time location of the aircraft superimposed on the non-linear planned flight path on the map based on real-time location data associated with the aircraft, the terrain profile comprising the terrain signature, the planned altitude relative to the terrain signature, a real-time location of the aircraft superimposed on the planned altitude based on the real-time location data associated with the aircraft, and the sub-terrain profile; wherein the HMI controls the aircraft in real-time according to the user inputs.

17. The system of claim 16, wherein the route input system comprises a path extension controller configured to receive an input associated with a path-width corridor corresponding to a lateral path extension distance from the aircraft along the non-linear planned flight path, wherein the terrain profile controller is configured to provide an indication of the terrain features within the path-width corridor in the terrain profile based on the DTED associated with the geographic region of interest.

18. The system of claim 17, wherein the terrain profile controller is configured to generate the terrain signature to display a maximum elevation associated with the topography of the terrain features within the path extension controller along the non-linear planned flight path.

19. The system of claim 16, wherein the display system displays the sub-terrain profile in a size proximate to a size of the terrain profile by scaling the distance between the start line and the end line, the terrain signature, and the planned altitude.

* * * * *